(12) United States Patent
Gerdes et al.

(10) Patent No.: US 11,885,674 B2
(45) Date of Patent: Jan. 30, 2024

(54) PHOTOTRANSISTOR APPARATUS AND METHOD OF OPERATING THE PHOTOTRANSISTOR APPARATUS

(71) Applicant: Honeywell International Inc., Morris Plains, NJ (US)

(72) Inventors: Claas Gerdes, Brochterbeck (DE); Ralf Heinrich Schroder genannt Berghegger, Osnabruck (DE); August Wallmeyer, Lotte (DE)

(73) Assignee: Honeywell International Inc., Charlotte, NC (US)

( * ) Notice: Subject to any disclaimer, the term of this patent is extended or adjusted under 35 U.S.C. 154(b) by 137 days.

(21) Appl. No.: 17/217,670

(22) Filed: Mar. 30, 2021

(65) Prior Publication Data

US 2022/0003598 A1 Jan. 6, 2022

Related U.S. Application Data

(60) Provisional application No. 63/047,132, filed on Jul. 1, 2020.

(51) Int. Cl.
 *G01J 1/44* (2006.01)
(52) U.S. Cl.
 CPC ......... *G01J 1/44* (2013.01); *G01J 2001/4473* (2013.01)
(58) Field of Classification Search
 CPC ............................ G01J 1/44; G01J 2001/4473
 See application file for complete search history.

(56) References Cited

U.S. PATENT DOCUMENTS

| 3,737,883 | A | * | 6/1973 | Sordello | G05D 3/1445 |
| | | | | | 318/687 |
| 4,208,617 | A | * | 6/1980 | Schneider | G03B 15/05 |
| | | | | | 315/159 |
| 4,799,044 | A | * | 1/1989 | Masters | H03K 17/941 |
| | | | | | 250/221 |

(Continued)

OTHER PUBLICATIONS

Honeywell American Meter, AC-250NX Diaphragm Meter, 2019.

(Continued)

*Primary Examiner* — David P Porta
*Assistant Examiner* — Gisselle M Gutierrez
(74) *Attorney, Agent, or Firm* — Ortiz & Lopez, PLLC; Luis M. Ortiz; Kermit D. Lopez

(57) ABSTRACT

A phototransistor apparatus and a method of operating the phototransistor apparatus. The phototransistor apparatus can include a phototransistor, a light source, and a supply voltage associated with the phototransistor. After switching on the supply voltage, the phototransistor can generate a phototransistor signal that is scanned, wherein the supply voltage associated with the phototransistor is switched on later than the light source, and wherein charge carriers in a base area of the phototransistor are reactive to a light pulse from the light source in a currentless state, and continue to react after the light source is switched off. Alternatively, the power supply of the phototransistor can be switched on before the light source is switched off. By delaying the switching on of the power supply of the phototransistor compared to the switching on of the light source, a significant current saving can be achieved.

18 Claims, 3 Drawing Sheets

(56) References Cited

U.S. PATENT DOCUMENTS

| | | | |
|---|---|---|---|
| 5,243,216 A * | 9/1993 | Noguchi | H01L 31/03762 |
| | | | 257/53 |
| 5,414,254 A * | 5/1995 | Blasingame | H03K 17/941 |
| | | | 250/221 |
| 5,769,384 A * | 6/1998 | Baumgartner | H04N 3/155 |
| | | | 348/E3.018 |
| 6,104,020 A * | 8/2000 | Knee | G01D 5/26 |
| | | | 250/214 R |
| 7,982,178 B2 | 7/2011 | Shannon et al. | |
| 10,408,650 B2 | 9/2019 | Sai et al. | |
| 2009/0206237 A1 | 8/2009 | Shannon et al. | |
| 2013/0127504 A1* | 5/2013 | Hayashi | H01L 27/14612 |
| | | | 257/290 |
| 2017/0241822 A1* | 8/2017 | Wong | G01D 4/02 |
| 2018/0233532 A1 | 8/2018 | Yao | |
| 2019/0118224 A1 | 4/2019 | Kastelein et al. | |
| 2020/0109977 A1 | 4/2020 | Sai et al. | |

OTHER PUBLICATIONS

Fairchild Semiconductor, Application Note AN-3005, Design Fundamentals for Phototransistor Circuits, REV. 4.00 Apr. 30, 2002.

Wikipedia, Photodiode, Retrieved from "https://en.wikipedia.org/w/index.php?title=Photodiode&oldid=958823961", page was last edited on May 25, 2020, at 22:03 (UTC).

"What is a Phototransistor?", https://www.tech-faq.com/what-is-a-phototransistor.html, Jun. 3, 2020.

* cited by examiner

PHOTOTRANSISTOR APPARATUS AND METHOD OF OPERATING THE PHOTOTRANSISTOR APPARATUS

CROSS-REFERENCE TO PROVISIONAL APPLICATION

This patent application claims priority under 35 U.S.C. § 119(e) to U.S. Provisional Patent Application Ser. No. 63/047,132 entitled "Phototransistor Apparatus and Method of Operating the Phototransistor Apparatus," which was filed on Jul. 1, 2020, the disclosure of which is incorporated herein by reference in its entirety.

TECHNICAL FIELD

Embodiments relate to light sensitive electronic devices such as phototransistors. Embodiments further relate to phototransistors used in gas meters including diaphragm gas meters.

BACKGROUND

A phototransistor is a type of device that can convert light signals into electric signals. Phototransistors are similar to photoresistors in that both can modulate current and voltage. A phototransistor can be configured a bipolar semiconductor and can focus the energy that is passed through it. Photons (light particles) activate phototransistors and are used in virtually all electronic devices that depend on light in some way.

A typical phototransistor can be implemented as a bipolar device that is completely made of silicon or another semiconductive material and is dependent on light energy. Phototransistors can be encased in an opaque or clear container in order to focus light as it travels therethrough, and permits the light to reach the phototransistor's sensitive components. A phototransistor may include an exposed base that converts the light into an electrical signal. As the current spreads from the base to the emitter, an amplified current from the collector to the emitter is enabled. This can cause a relatively high current to pass through the phototransistor.

Phototransistors are often used in optical receivers of light barriers because they are more light-sensitive than photodiodes and therefore a simple and inexpensive circuit design is possible without additional amplifiers. In battery-powered systems, however, the slow switching speed of the phototransistors often has a negative effect, since this requires a longer duration of the light impulses. This results in higher energy consumption and thus larger and more expensive batteries must be used. In addition, the lifetime of the light source is reduced if the light source must be switched on for a long time.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the disclosed embodiments to provide for improved for an improved phototransistor apparatus and a method of operating the phototransistor apparatus It is another aspect of the disclosed embodiments to provide for a phototransistor apparatus that uses the advantages of the phototransistor light barrier while enabling phototransistor operations with low energy consumption.

It is a further aspect of the disclosed embodiments to increase the lifetime of the battery utilized with the phototransistor apparatus due to a shorter switch on-time, which reduces necessary battery capacity for battery-powered devices, thereby reducing associated battery costs.

The aforementioned aspects and other objectives can now be achieved as described herein. In an embodiment, a phototransistor apparatus can include a phototransistor, a light source, and a supply voltage associated with the phototransistor. After switching on the supply voltage, the phototransistor can generate a phototransistor signal that can be scanned, wherein the supply voltage associated with the phototransistor is switched on later than the light source, and wherein charge carriers in a base area of the phototransistor are reactive to a light pulse from the light source in a currentless state, and continue to react after the light source is switched off. In an alternative embodiment, the power supply of the phototransistor can be switched on before the light source is switched off. By delaying the switching on of the power supply of the phototransistor compared to the switching on of the light source, a significant current saving can be achieved.

In an embodiment, the phototransistor, the light source and the supply voltage can be implemented in a gas meter such as a diaphragm gas meter.

In an embodiment, the light source can be switched on at a voltage approximately equal or greater to 2.5 V.

In an embodiment, the light source can comprise a visible light source.

In an embodiment, the light source can comprise a near infrared light source.

In an embodiment, the light source can comprise a light emitting diode.

In another embodiment, a phototransistor apparatus, can include a phototransistor; a light source; and a supply voltage electrically connected to the phototransistor, wherein after switching on the supply voltage, the phototransistor generates a phototransistor signal that is scanned, wherein the light source is switched off before the phototransistor signal is scanned, and wherein charge carriers in a base area of the phototransistor are reactive to a light pulse from the light source in a currentless state, and continue to react after the light source is switched off, and wherein the supply voltage is switched on when the light source is already switched off.

In another embodiment, a method of operating a phototransistor apparatus, can involve switching on a supply voltage associated with a phototransistor, wherein after switching on the supply voltage, the phototransistor generates a phototransistor signal that is subsequently scanned; and switching off a light source before the phototransistor signal is scanned, wherein charge carriers in a base area of the phototransistor are reactive to a light pulse from the light source in a currentless state, and continue to react after the light source is switched off.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 1 illustrates a block diagram of phototransistor apparatus, which can be implemented in accordance with an embodiment.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
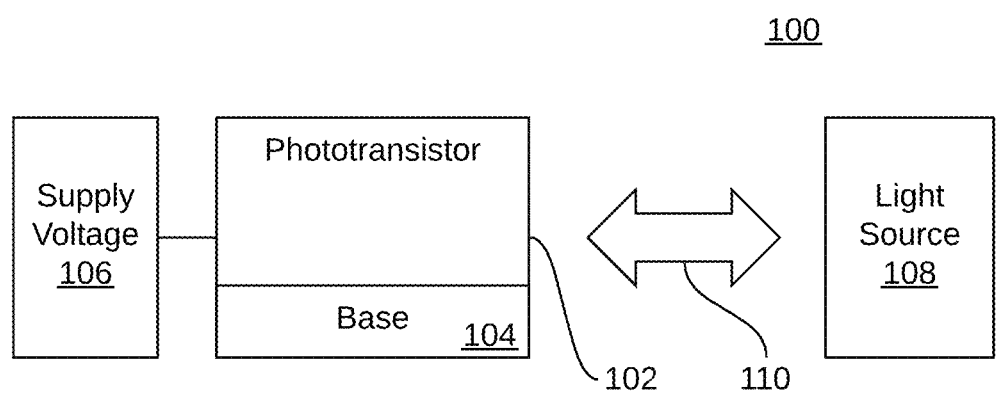

FIG. 1 illustrates a block diagram of phototransistor apparatus 100, which can be implemented in accordance with an embodiment. As shown in FIG. 1, the phototransistor apparatus 100 can include a phototransistor 102 having a base area 104. The phototransistor apparatus 100 can further include a light source 108. The arrow 110 shown in FIG. 1 represents a light pulse from the light source 108. The phototransistor apparatus 100 can further include a supply voltage 106, which is associated with the phototransistor 102.

The term "phototransistor" as utilized herein can refer to a light-sensitive transistor. A common type of phototransistor, the bipolar phototransistor, is in essence a bipolar transistor encased in a transparent case so that light can reach the base-collector junction. The term "phototransistor" can apply to both homo-junction phototransistors and hetero-junction phototransistors (HPT). Therefore, the term "phototransistor" as utilized herein can be interpreted to encompass both homo-junction (e.g., silicon) phototransistors and hetero-junction (e.g., SiGe and SiGeC) phototransistors.

A phototransistor may have three regions: the emitter (E), the base (B) and the collector (C). An example of a base is the base area 104 of the phototransistor 102. The emitter junction (ej), also called the emitter-base junction, or the E-B junction, is the p-n junction between the emitter and the base; and the collector junction (cj), also called the base-collector junction, or the B-C junction, is the p-n junction between the collector and the base. Here, a p-n junction refers to the p-n junction or its p-i-n junction variant between an n-type doped semiconductor and a p-type doped semiconductor. Therefore, the term "p-n junction" can be interpreted to encompass both the p-n junction and its p-i-n junction variant.

After switching on the supply voltage 106, the phototransistor 102 can generate a phototransistor signal that is scanned. The light source 108 can be switched off before the phototransistor signal is scanned. Charge carriers in the base area 104 of the phototransistor 102 are reactive to the light pulse from the light source 108 in a currentless state, and continue to react after the light source 108 is switched off.

The supply voltage 106 can be switched off when the light source 108 is already switched off. In addition, the light source 108 can be switched on at a voltage approximately equal or greater to 2.5 V. The light source 108 can be, for example, a visible light source, a near infrared light source, or a light emitting diode.

In some embodiments, the phototransistor 102, the light source 108 and the supply voltage 106 can be implemented in the context of a gas meter including, but not limited to, a diaphragm gas meter. One example of a gas meter, which may incorporate the embodiments is the AC-250NXS gas meter produced by Honeywell International Inc.

Figure 2:
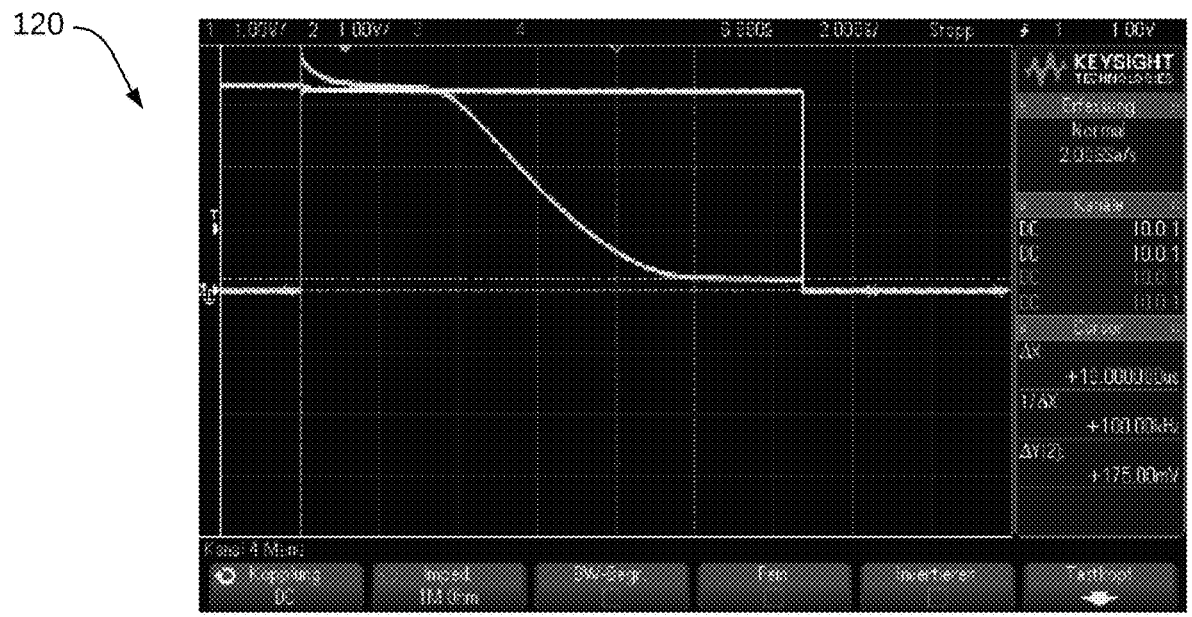
FIG. 2 illustrates a graph depicting a phototransistor and a light source switch-on signal, in accordance with a prior art arrangement that includes a light source and a power supply of a phototransistor switched on at the same time.

FIG. 2 illustrates a graph 120 depicting a prior art phototransistor signal and a light source switch-on signal, in accordance with a prior art arrangement. Normally, switching on the light source and then waiting for the reaction time until the phototransistor of the receiver is scanned can accomplish the regular scanning of a photoelectric sensor. After the subsequent scanning, the light source is switched off again. With this known method the light source is switched on for a long time, so that the current consumption is relatively high due to the long reaction time of the phototransistor. These characteristics are demonstrated in graph 120 shown FIG. 2.

In the example graph 120 shown in FIG. 2, the reaction time of the phototransistor (green curve) can be about 10 µs. This can be followed by a scanning operation, and then switching off of the light source (yellow curve), so that the light source can remain switched on for another 2 µs to 3 µs. In the example, the light source can be switched on for about 12 µs to 13 µs in total. In graph 120, the phototransistor signal (green curve) is shown, wherein the lower the voltage, the more light that is detected. The light source switch-on signal (yellow curve) indicates: 3.2 V=>light switched on.

The disclosed embodiments can exploit the physical property of the phototransistor wherein the charge carriers in the base area react to the light even in a currentless state and these reactions continue even after the light source is switched off. This means that no current flow through the light source is necessary during the reaction time of the phototransistor to a previous light pulse and during the sampling of the signal.

Figure 3:
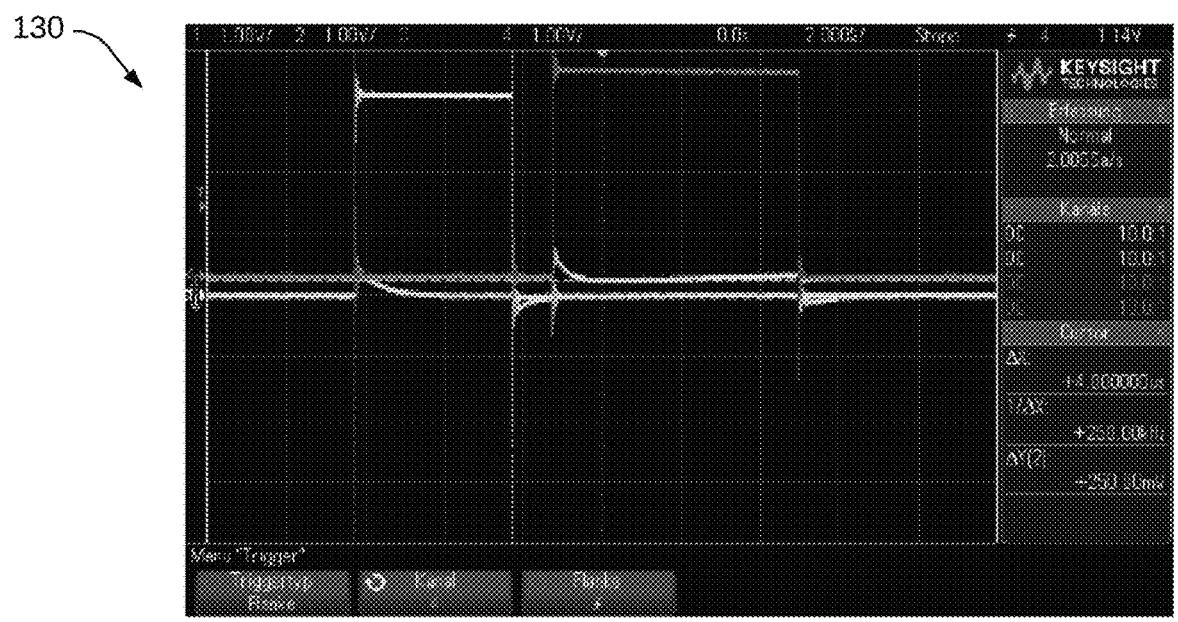
FIG. 3 illustrates a graph depicting a phototransistor signal, a light source switch-on signal, and a supply voltage of the phototransistor, in accordance with an embodiment.

FIG. 3 illustrates a graph 130 depicting a phototransistor signal, a light source switch-on signal, and a supply voltage of the phototransistor 102, in accordance with an embodiment. After switching on the phototransistor 102, the corresponding voltage (in the example a small voltage, because light is detected) can be quickly established, which can then be scanned. The recharging of parasitic capacitances in the phototransistor 102 or the signal lines can thus be avoided, which can significantly reduce the reaction time and thus the energy consumption (in the example the switch-on time of the light source is shown reduced from about 13 µs to 4 µs, factor 3.25). The shorter switch-on time of the light source also helps to increase the lifetime of this component.

As shown in graph 130, the signal (green curve) of the phototransistor 102 indicates that the lower the voltage the more light is detected. The light source switch-on signal (yellow curve) indicates: 3.2 V=>light switched on. The supply voltage of the phototransistor 102 is indicated by the red curve in graph 130. It can be appreciated that the specific data (e.g., 3.2 V, etc) shown and discussed herein with respect to the various disclosed graphs are not considered limiting features of the embodiments, but are presented as examples and for edification purposes.

Figure 4:
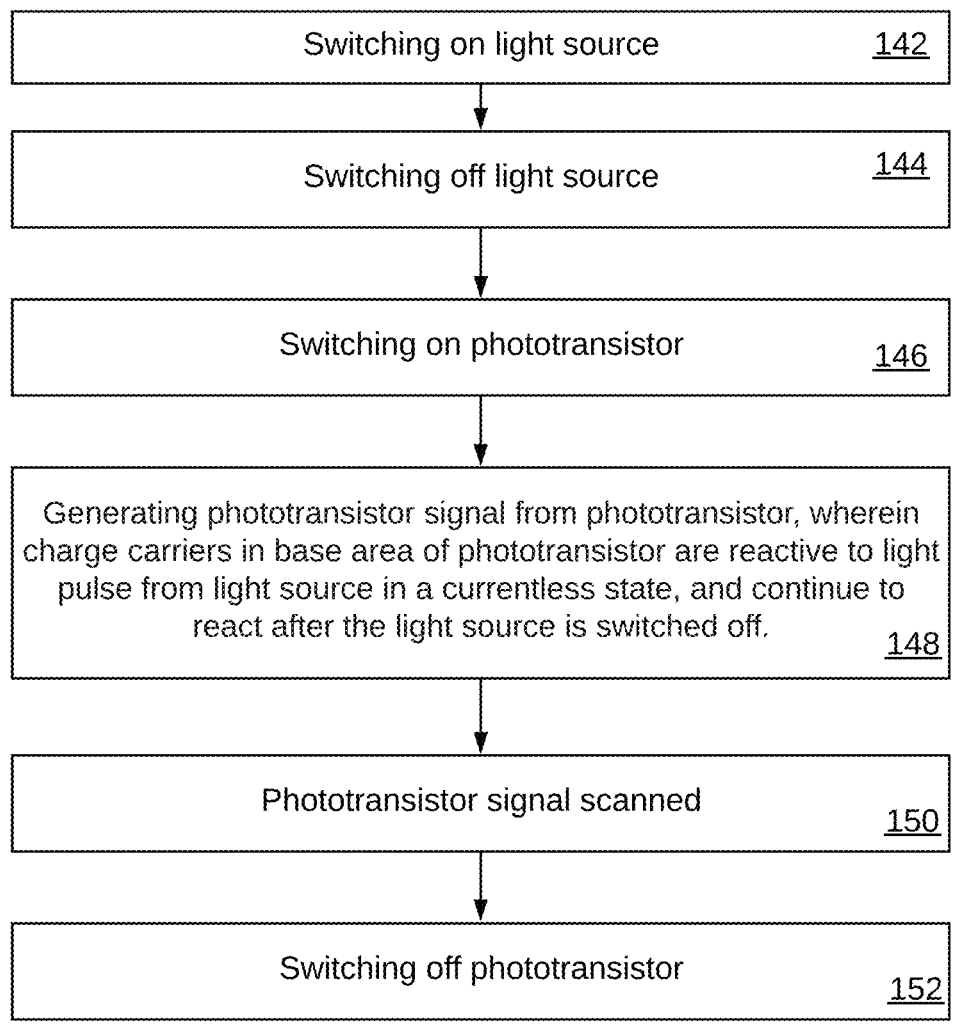
FIG. 4 illustrates a flow diagram depicting logical operational steps of a method for operating a phototransistor apparatus, in accordance with an embodiment.

FIG. 4 illustrates a flow diagram depicting logical operational steps of a method 140 for operating the phototransistor apparatus 100, in accordance with an embodiment. Note that the operations shown in FIG. 4 depict steps or operations in which the light pulse is generated (e.g., light on, wait 4 µs, light off), and then the supply voltage of the phototransistor is switched on and the phototransistor signal scanned.

As shown at block 142, a step or operation can be implemented to switch on the light source 108. Thereafter, as depicted at block 144, a step or operation can be implemented to switch off the light source 108. Then, as shown at block 146, a step or operation can be implemented to switch on the phototransistor 102. Next, as illustrated at block 148, a step or operation can be implemented to generate a phototransistor signal from the phototransistor 102, wherein charge carriers in base area 104 of the phototransistor 102 are reactive to a light pulse (or light pulses) from light source 108 in a currentless state, and continue to react after the light source 108 is switched off.

Following processing of implementation of the operation depicted at block 148, a step or operation can be implemented, as shown as block 150, in which the phototransistor signal is scanned. Thereafter, as indicated at block 152, a step or operation can be implemented in which the phototransistor 102 is switched off.

Based on the foregoing, it can be appreciated that after switching on the supply voltage, the phototransistor can generate a phototransistor signal that can be scanned. The supply voltage associated with the phototransistor can be switched on later than the light source. The charge carriers in the base area of the phototransistor are reactive to a light pulse from the light source in a currentless state, and continue to react after the light source is switched off. Alternatively, the power supply of the phototransistor can be switched on before the light source is switched off. By delaying the switching on of the power supply of the phototransistor compared to the switching on of the light source, a significant current saving can be achieved.

It will be appreciated that variations of the above-disclosed embodiments and examples and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A phototransistor apparatus, comprising:
   a phototransistor;
   a light source; and
   a supply voltage associated with the phototransistor, wherein the phototransistor, the light source and the supply voltage are implemented in a gas meter, wherein after switching on the supply voltage, the phototransistor generates a phototransistor signal that is scanned, wherein the supply voltage associated with the phototransistor is switched on later than the light source, and wherein charge carriers in a base area of the phototransistor are reactive to a light pulse from the light source in a currentless state, and continue to react after the light source is switched off.

2. The phototransistor apparatus of claim 1 wherein the supply voltage associated with the phototransistor is switched on when the light source is already switched off.

3. The phototransistor apparatus of claim 1 wherein the gas meter comprises a diaphragm gas meter.

4. The phototransistor apparatus of claim 1 wherein the light source is switched on at a voltage approximately equal or greater to 2.5 V.

5. The phototransistor apparatus of claim 1 wherein the light source comprises a visible light source.

6. The phototransistor apparatus of claim 1 wherein the light source comprises a near infrared light source.

7. The phototransistor apparatus of claim 1 wherein the light source comprises a light emitting diode.

8. A phototransistor apparatus, comprising:
   a phototransistor;
   a light source; and
   a supply voltage electrically connected to the phototransistor, wherein the phototransistor, the light source and the supply voltage are implemented in a gas meter, wherein after switching on the supply voltage, the phototransistor generates a phototransistor signal that is scanned, wherein the light source is switched off before the phototransistor signal is scanned, and wherein charge carriers in a base area of the phototransistor are reactive to a light pulse from the light source in a currentless state, and continue to react after the light source is switched off, and wherein the supply voltage is switched on when the light source is already switched off.

9. The phototransistor apparatus of claim 8 wherein the gas meter comprises a diaphragm gas meter.

10. The phototransistor apparatus of claim 8 wherein the light source is switched on at a voltage approximately equal or greater to 2.5 V.

11. The phototransistor apparatus of claim 8 wherein the light source comprises a visible light source.

12. The phototransistor apparatus of claim 8 wherein the light source comprises a near infrared light source.

13. The phototransistor apparatus of claim 8 wherein the light source comprises a light emitting diode.

14. A method of operating a phototransistor apparatus, comprising:
  switching on a supply voltage associated with a phototransistor, wherein after switching on the supply voltage, the phototransistor generates a phototransistor signal that is subsequently scanned; and
  switching off a light source before the phototransistor signal is scanned, wherein charge carriers in a base area of the phototransistor are reactive to a light pulse from the light source in a currentless state, and continue to react after the light source is switched off.

15. The method of claim 14 wherein the supply voltage associated with the phototransistor is switched on when the light source is already switched off.

16. The method of claim 14 wherein the phototransistor, the light source and the supply voltage are implemented in a gas meter.

17. The method of claim 14 further comprising switching the light source on at a voltage approximately equal or greater to 2.5 V.

18. The method of claim 14 wherein the light source comprises at least one of: a visible light source, a near infrared light source, and a light emitting diode.

* * * * *